Figure 1:
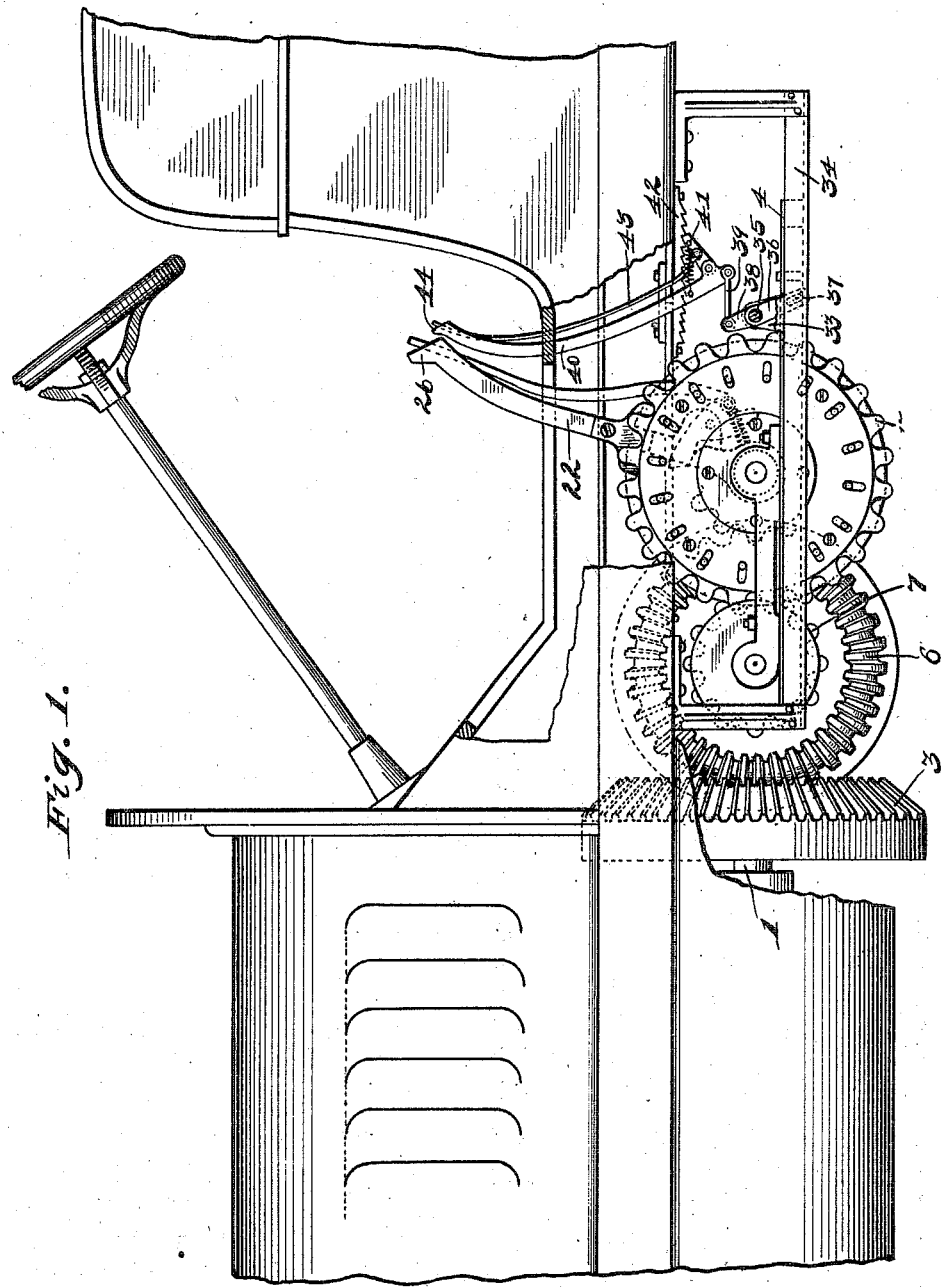

H. E. WILSON.
AUTOMOBILE ENGINE STARTER.
APPLICATION FILED AUG. 24, 1910.

985,719.

Patented Feb. 28, 1911.
3 SHEETS—SHEET 1.

Witnesses:
C. E. Wessels.
B. G. Richards

Inventor:
Henry E. Wilson,
By Joshua R H Potts
his Attorney.

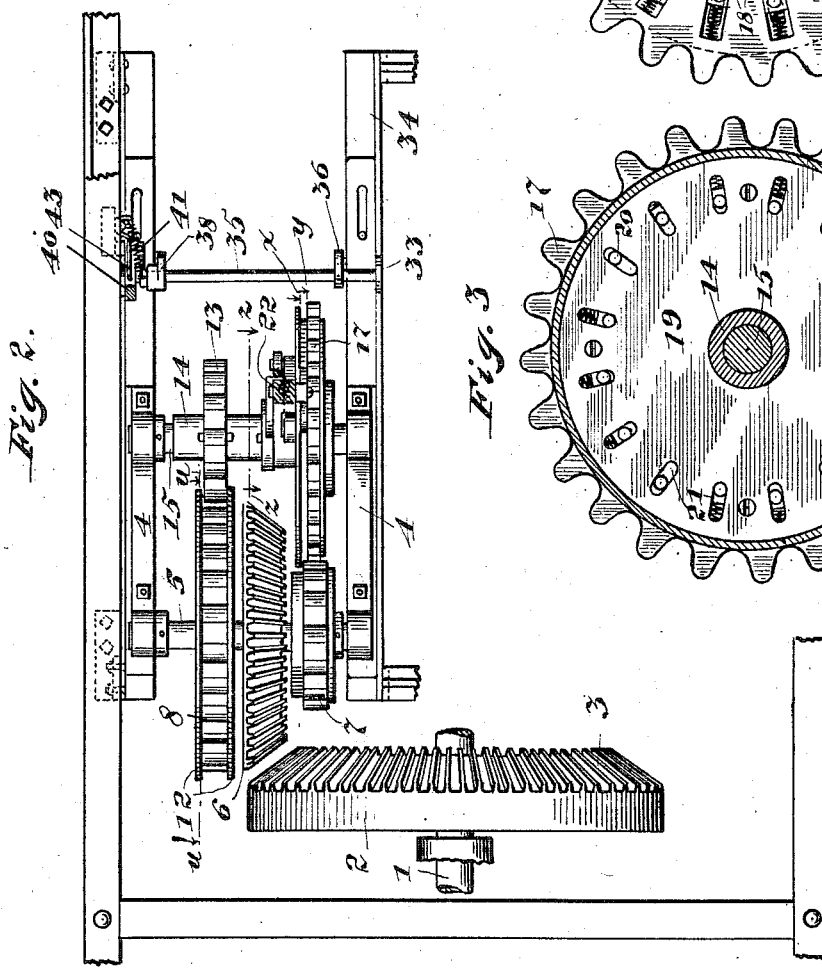

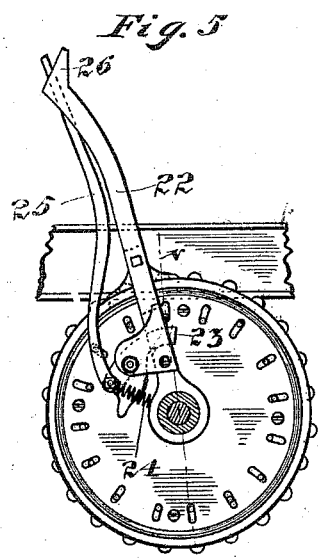
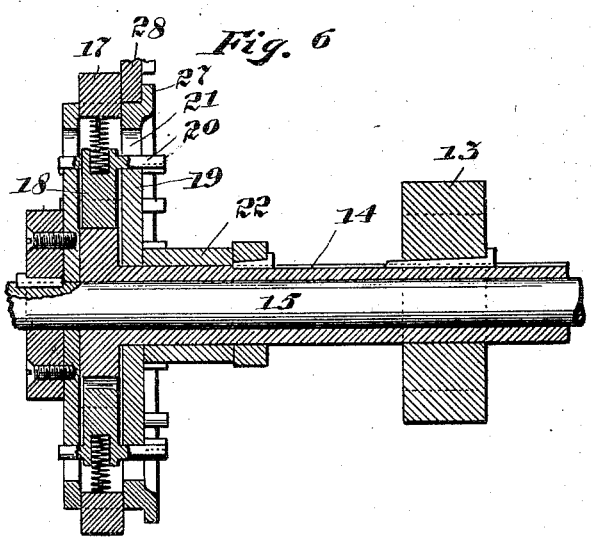
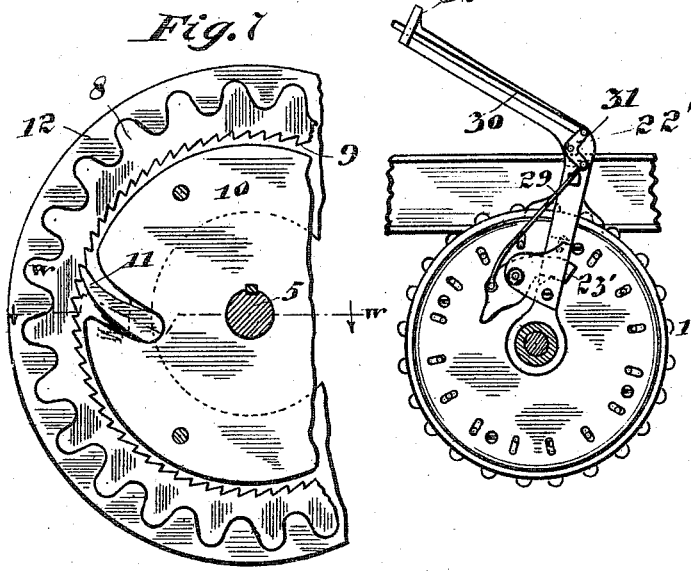
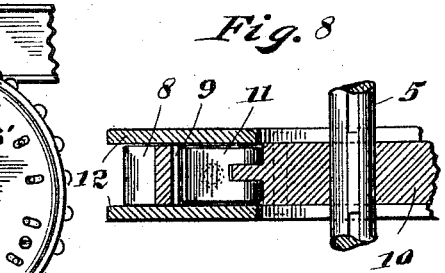

UNITED STATES PATENT OFFICE.

HENRY E. WILSON, OF CHICAGO, ILLINOIS, ASSIGNOR OF ONE-FOURTH TO RALPH W. McKINNEY AND ONE-FOURTH TO DAVID DEE, BOTH OF CHICAGO, ILLINOIS.

AUTOMOBILE ENGINE-STARTER.

985,719.

Specification of Letters Patent. Patented Feb. 28, 1911.

Application filed August 24, 1910. Serial No. 578,660.

*To all whom it may concern:*

Be it known that I, HENRY E. WILSON, a subject of the King of Great Britain, residing at Chicago, county of Cook, and State of Illinois, have invented certain new and useful Improvements in Automobile Engine-Starters, of which the following is a specification.

My invention relates to improvements in automobile engine starters and has for its object the provision of a simple and efficient mechanism for starting automobile engines which eliminates all danger to the operator from premature firing of the engine.

The invention consists in the combination and arrangement of parts hereinafter described and claimed.

The invention will be more readily understood by reference to the accompanying drawings forming a part of this specification, and in which—

Figure 1 is a sectional elevation of a portion of an automobile equipped with a starting mechanism embodying my invention, Fig. 2 is a sectional plan view of the mechanism, Fig. 3 is an enlarged partial section on line $x$ of Fig. 2, Fig. 4 is an enlarged partial section on line $y$ of Fig. 2, Fig. 5 is a section on line $z$—$z$ of Fig. 2, Fig. 6 is an enlarged section on line $v$—$v$ of Fig. 5, Fig. 7 is an enlarged partial section on line $u$—$u$ of Fig. 2, Fig. 8 is a section on line $w$—$w$ of Fig. 7, and Fig. 9 is a sectional elevation illustrating a modified form of starting lever.

The preferred form of construction as illustrated in the drawings comprises an ordinary engine shaft 1 carrying a fly wheel 2 thereon. One face of fly wheel 2 is provided with bevel gear teeth 3. A frame 4 is slidably mounted under the body of the automobile and carries a countershaft 5 at right angles to engine shaft 1. Fixed to countershaft 5 is a bevel gear 6 adapted to mesh with bevel gear teeth 3 on fly wheel 2 when frame 4 is moved to the proper position. Shaft 5 also carries a small pinion 7 fixed thereto and a large annular gear 8 having internal ratchet teeth 9 on its inner surface. Gear 8 encompasses a hub 10 fixed to shaft 5 and carrying a spring held pawl 11 by means of which rotation of gear 8 relatively to shaft 5 is permitted in one direction but prevented in the other. Gear 8 is held in position on hub 10 by means of side plates 12 secured to hub 10. Gear 8 meshes with a small pinion 13 fixed to a sleeve 14 which is loosely mounted on a starting shaft 15 mounted in frame 4 parallel to shaft 5. At its other end sleeve 14 is provided with a ratchet wheel 16 encompassed by an annular gear 17 fixed to shaft 15, as shown. Gear 17 carries a series of radially slidable spring held pawls 18 adapted to contact and coöperate with the teeth of ratchet wheel 16, as indicated in Fig. 4. Pawls 18 are held in place by means of a plate 19 secured to the side of gear 17. Each of the pawls 18 carries a pin 20 projecting through a corresponding radial slot 21 in plate 19. A foot lever 22 is rotatably mounted on sleeve 14 adjacent plate 19 and carries a pawl 23 provided with a spring 24 for normally holding it out of engagement with pins 20. Lever 22 also carries a longitudinally slidable push rod 25 having its lower end pivoted to pawl 23 and its upper end projecting from the upper end 26 of lever 22. Plate 19 carries a radially extending flange 27 adapted to engage a shoe 28 pivoted to the side of foot lever 22 and serving to hold said lever in operative relation to pins 20. By this construction it will be observed that by manipulating lever 22 with the foot, pawl 23 will be thrown outwardly to engage one of the pins 20, thus enabling the rotation of gear 17 by said lever. Gear 17 meshing with pinion 7 serves to rotate bevel gear 6 which, when in mesh with bevel gear 3, serves to rotate engine shaft 1 to start the engine, as will be readily understood. During this operation should the engine fire prematurely and thus reverse the direction of rotation of engine shaft 1 and consequently of gears 6, 7 and 17, the gear 8 then fixed to shaft 5 will rotate gear 13 at a much higher speed than that of gear 17. The higher speed of rotation of gear 13 will cause ratchet wheel 16 to rotate at a higher speed than gear 17 and thus cause the ratchet teeth on ratchet 16 to operate pawls 18 outwardly and radially, thus preventing engagement with pawl 23 and consequent jar or shock to the operator. It will be observed that there are a greater number of pawls 18 than there are teeth in ratchet wheel 16 so that some of said pawls always rest in the interstices between said ratchet teeth and thus place the corresponding pin 20 in position for engagement by pawl 23.

In Fig. 9 I have illustrated a modified form of foot lever 22' which is made angular in form, as shown. This lever carries a spring held pawl 23' exactly similar in operation to pawl 23 above described and serving to place the gear wheel 17 under the domination of foot lever 22'. Foot lever 22' carries push rods 29 and 30 connected together by means of a bell-crank lever 31, the lower end of rod 29 being connected with pawl 23' for manipulation of the same as before. The upper end of push rod 30 projects from the upper end 32 of foot lever 22' and serves to cause pawl 23' to be thrown into operative relation with pins 20 upon manipulation of lever 22' as before. The angular form of lever 22' permits the use of a shorter slot in the bottom of the automobile.

For the manipulation of frame 4 I provide lugs 33 extending upwardly from the supporting frame 34 suspended from the bottom of the automobile frame. Lugs 33 support a rock shaft 35 carrying links 36 having a slot and pin connection 37 between their lower ends and the sides of frame 4. One of the links 36 is provided with an upwardly extending rock arm 38 connected by means of the link 39 with the lower end of the foot lever 40 pivoted in the frame of the automobile, as shown. Foot lever 40 carries a spring held pawl 41 coöperating with a rack bar 42 on the bottom of the automobile frame to hold frame 4 in positions to which it is advanced by manipulation of said lever 40. Foot lever 40 carries a push rod 43 connected at its lower end with pawl 41 and projecting from the upper end 44 of foot lever 40. By this construction it will be observed that by the manipulation of foot lever 40 the frame 4 may be advanced to cause intermeshing between bevel gears 6 and 3 and held in such position by means of pawl 41, and that upon release of pawl 41 by touching the end of push rod 43 the interaction between bevel gears 3 and 6 will cause frame 4 to recede to its inoperative position with gear 6 out of mesh with gear 3. This furnishes an efficient means for throwing the starting mechanism into and out of operative relation.

While I have illustrated and described the preferred form of construction for carrying my invention into effect this is capable of variation or modification without departing from the spirit of the invention. I therefore do not wish to be limited to the exact details set forth but desire to avail myself of such variations and modifications as come within the scope of the appended claims.

Having described my invention what I claim as new and desire to secure by Letters Patent is:

1. In an engine starter, the combination with an engine shaft of a countershaft having a geared connection with said engine shaft; a small pinion on said countershaft; a large gear having a pawl and ratchet connection with said countershaft; a starting shaft; a small pinion loosely mounted on said starting shaft and meshing with said large gear on said countershaft; a large gear loosely mounted on said starting shaft; a starting lever loosely mounted on said starting shaft and having a pawl and ratchet connection with the large gear on said starting shaft; and means operable by said small gear on said starting shaft for throwing said starting lever pawl and ratchet connection out of operation upon reverse rotation thereof, substantially as described.

2. In an engine starter, the combination with an engine shaft of a bevel gear fixed to said engine shaft; a countershaft; a bevel gear fixed to said countershaft and meshing with said first mentioned bevel gear; a small pinion fixed to said countershaft; a large gear loosely mounted on said countershaft; a pawl and ratchet connection between said large gear and said countershaft; a starting shaft parallel with said countershaft; a sleeve loosely mounted on said starting shaft; a small pinion fixed to said sleeve and meshing with the large gear on the countershaft; a ratchet wheel on said sleeve; a large gear loosely mounted on said starting shaft and meshing with the small gear on the countershaft; a series of radiating spring held pawls slidably mounted on said large gear on said starting shaft and adapted to be operated radially by said ratchet wheel; engagement pins carried by said radiating pawls; a starting lever loosely mounted on said starting shaft; and a pawl on said starting lever arranged to engage said pins to operate the device, substantially as described.

3. In an engine starter, the combination with an engine shaft of a bevel gear fixed to said engine shaft; a countershaft; a bevel gear fixed to said countershaft and meshing with said first mentioned bevel gear; a small pinion fixed to said countershaft; a large gear loosely mounted on said countershaft; a pawl and ratchet connection between said large gear and said countershaft; a starting shaft parallel with said countershaft; a sleeve loosely mounted on said starting shaft; a small pinion fixed to said sleeve and meshing with the large gear on the countershaft; a ratchet wheel on said sleeve; a large gear loosely mounted on said starting shaft and meshing with the small gear on the countershaft; a series of radiating spring held pawls slidably mounted on said large gear on said starting shaft and adapted to be operated radially by said ratchet wheel; engagement pins carried by said radiating pawls; a starting lever loosely mounted on said starting shaft; a pawl on said starting lever arranged to engage said pins to operate the device; a spring normally holding said lever pawl from engagement with said pins; and means carried by said lever for throwing its pawl into operative position, substantially as described.

4. In an engine starter, the combination with an engine shaft, of a bevel gear fixed to said engine shaft; a frame slidable toward and away from said engine shaft; means for manipulating said frame; a countershaft mounted in said frame; a bevel gear fixed to said countershaft and meshing with said first mentioned bevel gear; a small pinion fixed to said countershaft; a large gear loosely mounted on said countershaft; a pawl and ratchet connection between said large gear and said countershaft; a starting shaft mounted in said slidable frame parallel with said countershaft; a sleeve loosely mounted on said starting shaft; a small pinion fixed to said sleeve and meshing with the large gear on the countershaft; a ratchet wheel on said sleeve; a large gear loosely mounted on said starting shaft and meshing with the small gear on the countershaft; a series of radiating spring held pawls slidably mounted on said large gear on said starting shaft and adapted to be operated radially by said ratchet wheel; engagement pins carried by said radiating pawls; a starting lever loosely mounted on said starting shaft; and a pawl on said starting lever arranged to engage said pins to operate the device, substantially as described.

5. In an engine starter, the combination with an engine shaft, of a bevel gear fixed to said engine shaft; a frame slidable toward and away from said engine shaft; means for manipulating said frame; a countershaft mounted in said frame; a bevel gear fixed to said countershaft and meshing with said first mentioned bevel gear; a small pinion fixed to said countershaft; a large gear loosely mounted on said countershaft; a pawl and ratchet connection between said large gear and said countershaft; a starting shaft mounted in said slidable frame parallel with said countershaft; a sleeve loosely mounted on said starting shaft; a small pinion fixed to said sleeve and meshing with the large gear on the countershaft; a ratchet wheel on said sleeve; a large gear loosely mounted on said starting shaft and meshing with the small gear on the countershaft; a series of radiating spring held pawls slidably mounted on said large gear on said starting shaft and adapted to be operated radially by said ratchet wheel; engagement pins carried by said radiating pawls; a starting lever loosely mounted on said starting shaft; a pawl on said starting lever arranged to engage said pins to operate the device; a spring normally holding said lever pawl from engagement with said pins; and means carried by said lever for throwing its pawl into operative position, substantially as described.

In testimony whereof I have signed my name to this specification in the presence of two subscribing witnesses.

HENRY E. WILSON.

Witnesses:
 HELEN F. LILLIS,
 JOSHUA R. H. POTTS.

Copies of this patent may be obtained for five cents each. by addressing the "Commissioner of Patents, Washington, D. C."